US006612962B2

(12) United States Patent
Mori

(10) Patent No.: US 6,612,962 B2
(45) Date of Patent: Sep. 2, 2003

(54) TOROIDAL CONTINUOUSLY VARIABLE TRANSMISSION

(75) Inventor: Haruhito Mori, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/856,527

(22) PCT Filed: Dec. 5, 2000

(86) PCT No.: PCT/JP00/08597

§ 371 (c)(1),
(2), (4) Date: May 23, 2001

(87) PCT Pub. No.: WO01/42684

PCT Pub. Date: Jun. 14, 2001

(65) Prior Publication Data

US 2002/0137592 A1 Sep. 26, 2002

(30) Foreign Application Priority Data

Dec. 9, 1999 (JP) ............................................. 11-350008

(51) Int. Cl.⁷ ................................................ F16H 15/38
(52) U.S. Cl. ............................................ 476/46; 476/40
(58) Field of Search ............................. 476/40, 42, 46; 384/51, 54, 620, 621, 623

(56) References Cited

U.S. PATENT DOCUMENTS

| 4,262,974 A | * | 4/1981 | Tojo et al. ...................... 384/54 |
| 4,955,246 A | * | 9/1990 | Nakano ........................... 476/46 |
| 5,299,987 A | * | 4/1994 | Dawe ............................. 476/10 |
| 5,320,434 A | * | 6/1994 | Fujihara et al. ............... 384/620 |
| 5,419,746 A | | 5/1995 | Nakano ........................... 476/10 |
| 5,720,689 A | * | 2/1998 | Imanishi et al. ............... 476/40 |
| 6,174,258 B1 | * | 1/2001 | Imanishi et al. ............... 476/40 |
| 6,251,041 B1 | * | 6/2001 | Ishikawa et al. ............... 476/40 |
| 6,332,858 B1 | * | 12/2001 | Mori et al. ..................... 476/46 |

FOREIGN PATENT DOCUMENTS

| JP | 6-129509 | 5/1994 |
| JP | 7-198014 | 8/1995 |
| JP | 2000-35101 | 2/2000 |

* cited by examiner

Primary Examiner—William C Joyce
Assistant Examiner—Timothy McAnulty
(74) Attorney, Agent, or Firm—Foley & Lardner

(57) ABSTRACT

A toroidal continuously variable transmission (10) comprises input disks (18a, 20a), output disks (18b, 20b) facing the input disks, power rollers (18c, 18d, 20c, 20d) gripped between the input disks and output disks, a pedestal (94) which supports the power rollers free to rotate, trunnions (17a, 17b, 27a, 27b) and roller bearing units (96) which support the pedestals on the trunnions so that they are free to slide in the direction perpendicular to the trunnion gyration axis (19a) and power roller rotation axis (15a), and further comprises projections (100) which limit the slide amount of a cage (96a) of the roller bearing unit relative to the trunnions. In this way, even if the power roller repeatedly slides relative to the trunnion (17a) in the direction perpendicular to the trunnion gyration axis (19a) and power roller rotation axis (15a), the cage (96a) does not protrude from the trunnion (17a), support of the load acting on the power roller is not insufficient, and the cage (96a) is prevented from interfering with the input and output disks as it would do if it protruded.

8 Claims, 8 Drawing Sheets

TOROIDAL CONTINUOUSLY VARIABLE TRANSMISSION

FIELD OF THE INVENTION

The present invention relates to a toroidal continuously variable transmission for vehicles.

BACKGROUND OF THE INVENTION

In a continuously variable transmission (hereafter, CVT), a pair of power rollers is gripped between an input disk and an output disk facing each other. The power rollers transmit a torque from the input disk to the output disk by friction. The power rollers are supported by trunnions.

When the trunnions are displaced in the direction of the trunnion axes, the contact positions of the power rollers and the disks change and the direction of the force exerted by the disks on the power rollers will vary. Due to this variation of force, the power rollers rotate together with the trunnions, and as a result, the contact radius of one of the input disk and the output disk increases, while the contact radius of the other disk decreases. The variation of these contact radii causes a variation of the ratio of the rotation speeds of the input disk and the output disk, i.e., a speed ratio. Thus, the speed ratio of the transmission can be made to vary continuously by displacing the trunnions in the trunnion axis direction. The rotation angle about the trunnion axis is referred to as the gyration angle of the power roller, and corresponds directly to the speed ratio of the CVT.

Here, when the power rollers are gripped between the input disk and the output disk, the input disk and the output disk respectively deform in an overturn direction. In order for the power rollers to follow the deformation in this overturn direction and maintain contact with both disks, they must follow the deformation of the disks in the overturn direction and must displace in the direction perpendicular to the trunnion axis and a power roller rotation axis.

To displace the power rollers in such a direction, the power rollers may be supported free to pivot on the trunnions via pivot shafts as disclosed in JP-A-H6-129509 published by the Japanese Patent Office in 1994. However, when a pivot shaft is used, the power rollers will displace not only in the above-mentioned direction but also in the direction perpendicular to it. Moreover, machining of the pivot shaft is difficult and the manufacturing cost of the pivot shaft is high. As it is necessary to provide a hole in the trunnion for supporting the pivot shaft, the strength of the trunnion decreases.

In this regard, in JP-A-H7-198014 published by the Japanese Patent Office in 1995, the pivot shaft is made unnecessary by supporting the power rollers free to slide in the direction perpendicular to the trunnion axis and the power roller rotation axis via a roller bearing unit comprising plural needle rollers and a cage which houses the plural needle rollers.

DISCLOSURE OF THE INVENTION

However, in the construction disclosed in JP-A-H7-198014, if the power rollers repeatedly slide due to the deformation of the input and output disks, the cage will slide due to the contact of the needle rollers and the cage. At this time, the magnitude of the force which acts on the cage when the power rollers are pushed and the cage slides, is different from that of the force which acts on the cage when the force acting on the power rollers is released and the cage returns, so the cage does not return to its original position completely.

Consequently, the cage protrudes from the trunnion, the needle rollers are gathered on one side, the force acting on the trunnion via the needle rollers is biased to one side, and the load acting on the power rollers can no longer be properly supported. Moreover, the protruding cage interferes with the input and output disks. This also occurs when the roller bearing unit is attached to the trunnion with an offset during assembly.

It is therefore an object of this invention to arrange that the cage of the roller bearing unit does not protrude from the trunnion, to prevent the situation that the load acting on the power rollers cannot be supported sufficiently, and to prevent the protruding cage from interfering with the input and output disks.

In order to achieve above object, this invention provides a toroidal continuously variable transmission comprising an input disk, an output disk facing the input disk, a power roller gripped between the input disk and the output disk, a pedestal which supports the power roller free to rotate about a power roller rotation axis, a trunnion which gyrates about a trunnion gyration axis, and a roller bearing unit which comprises a cage housing a roller and supports the pedestal on the trunnion so that the pedestal is free to slide in the direction perpendicular to the trunnion gyration axis and power roller rotation axis. A limiting member, which limits the slide amount of the cage of the roller bearing unit relative to the trunnion, is provided on the trunnion.

The details as well as other features and advantages of this invention are set forth in the remainder of the specification and are shown in the accompanying drawings.

DESCRIPTION OF THE PREFERRED EMBODIMENTS

Figure 1:
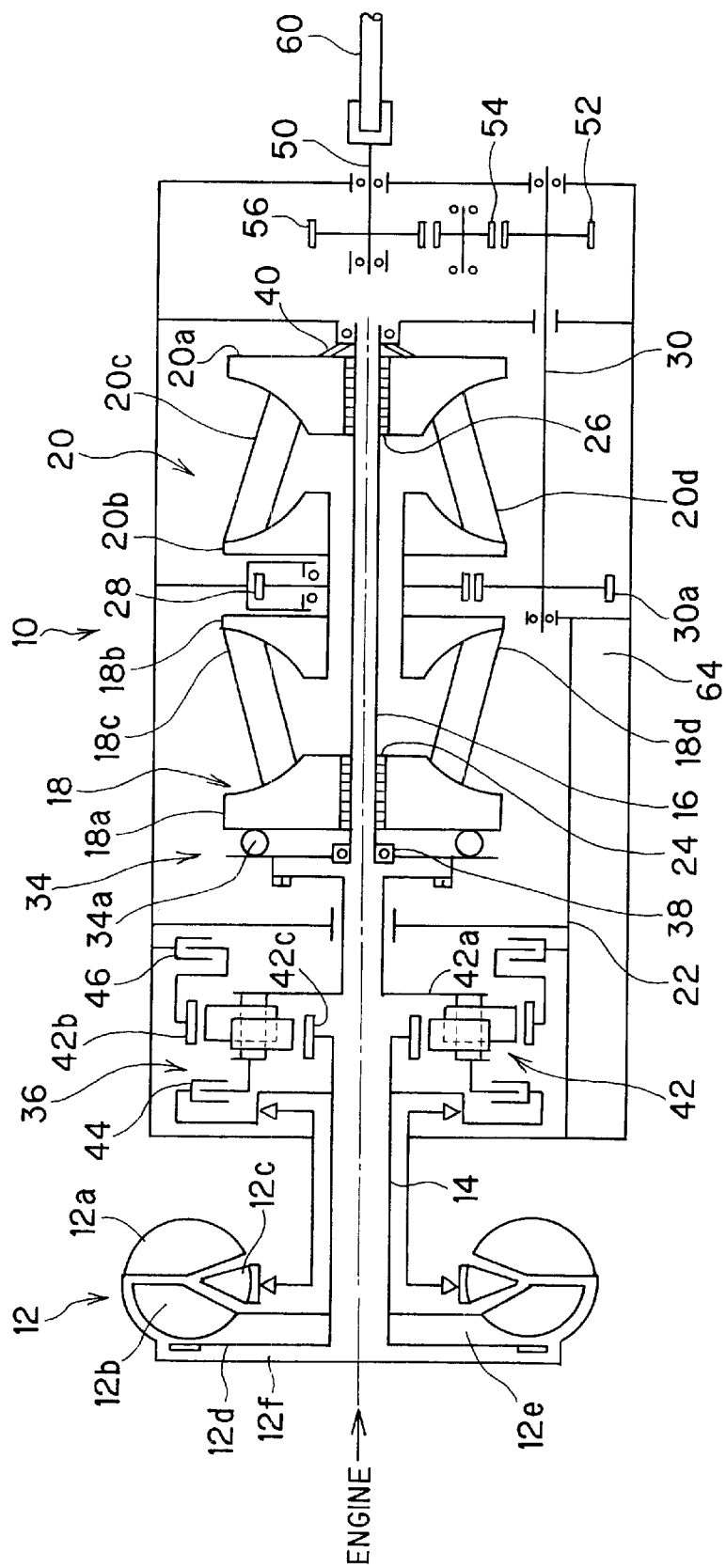
FIG. 1 is an overall schematic view of a toroidal continuously variable transmission (CVT) relating to this invention.

Referring to FIG. 1 of the drawings, a torque from an engine, not shown, is input to a toroidal continuously variable transmission (hereafter, CVT) 10 via a torque converter 12. The torque converter 12 comprises an impeller 12a, and a turbine 12b, stator 12c, lock-up clutch 12d, apply oil chamber 12e and release oil chamber 12f. An input shaft 14 passes through the torque converter 12.

The input shaft 14 is connected with a forward and reverse change-over device 36. The forward and reverse change-over device 36 comprises a planetary gear set 42, forward clutch 44 and reverse brake 46. The planetary gear set 42 comprises a pinion carrier 42a which supports a double pinion gear, a ring reduction gear 42b which meshes with a double pinion gear, and a sun gear 42c.

The pinion carrier 42a of the planetary gear set 42 is connected with a torque transmission shaft 16. A first speed change mechanism 18, and second speed change mechanism 20, are arranged inside a transmission case 22. Oil pressure control valves are housed in a base 64.

Figure 2:
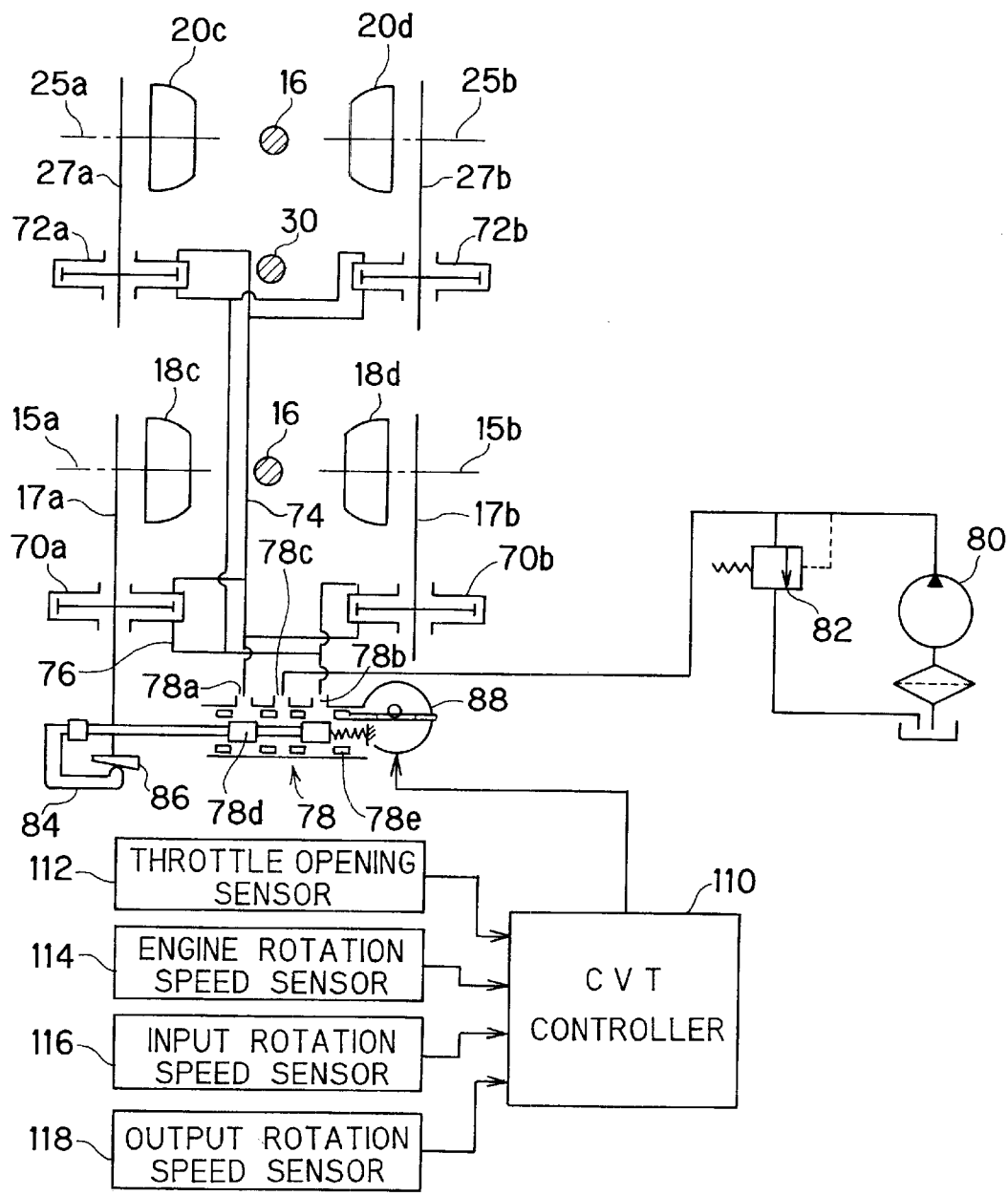
FIG. 2 shows the speed control system of the CVT.

The first speed change mechanism 18 is provided with an input disk 18a and output disk 18b whereof the opposite faces are formed as toroidal curved surfaces, and a pair of power rollers 18c, 18d gripped between the input and output disks 18a, 18b and arranged symmetrically on either side of the torque transmission shaft 16. The first speed change mechanism 18 comprises trunnions 17a, 17b which respectively support the power rollers 18c, 18d, and servo pistons 70a, 70b, as shown in FIG. 2.

The second speed change mechanism 20 is likewise provided with an input disk 20a and output disk 20b, a pair of power rollers 20c, 20d, trunnions 27a, 27b, and servo pistons 72a, 72b.

The speed change mechanisms 18, 20 are arranged on the torque transmission shaft 16. The input disk 18a of the first speed change mechanism 18 is pushed to the right of the figure by loading cams 34a of a loading mechanism 34 which generate a thrust force according to the input torque.

The loading mechanism 34 is supported by the torque transmission shaft 16 via a bearing 38. The input disk 20a of the second speed change mechanism 20 is pushed to the left of the figure by a belleville spring 40. The input disks 18a, 20a are supported by the transmission shaft 16 via ball splines 24, 26.

The power rollers 18c, 18d, 20c, 20d respectively gyrate to realize gyration angles corresponding to a target speed ratio, and the input rotation of the input disks 18a, 20a is continuously varied and transmitted to the output disks 18b, 20b.

The output disks 18b, 20b are joined by splines to the output gear 28. The torque transmitted to the output disks 18b, 20b is transmitted to a propeller shaft 60 via the output gear 28, gear 30a, shaft 30, gear 52, gear 54, gear 56 and shaft 50.

Next, the speed control system of the CVT 10 will be described referring to FIG. 2.

The speed control system causes the trunnions to respectively gyrate so that the gyration angle corresponding to a target speed ratio may be obtained.

The power rollers 18c, 18d, 20c, 20d are supported on pedestals, not shown, such that they are free to rotate about power roller rotation axes 15a, 15b, 25a, 25b, and the pedestals are supported by the trunnions 17a, 17b, 27a, 27b such that they are free to slide toward input or output disks. Servo pistons 70a, 70b, 72a, 72b which displace the trunnions 17a, 17b, 27a, 27b in their shaft direction and cause the power rollers 186, 18d, 20c, 20d to gyrate are provided at the lower ends of the trunnions 17a, 17b, 27a, 27b.

An oil passage 74 connected to a high oil chamber, an oil passage 76 connected to a low oil chamber, and a speed ratio control valve 78 comprising a port 78a connecting the oil passage 74 and a port 78b connecting the oil passage 76, are provided as an oil pressure control system which controls the servo pistons 70a, 70b, 72a, 72b. A line pressure from an oil pressure source comprising an oil pump 80 and a relief valve 82 is supplied to a line pressure port 78c of the speed ratio control valve 78. The spool 78d of the speed ratio control valve 78 cooperates with a lever 84 and cam 86 which feed back the axial displacement and gyration angle of the trunnion 17a to the speed ratio control valve 78. A sleeve 78e of the speed ratio control valve 78 is driven by a step motor 88.

The step motor 88 is controlled by a CVT controller 110. Signals from a throttle opening sensor 112, engine rotation speed sensor 114, input rotation speed sensor 116 and output rotation speed sensor 118 are input to the CVT controller 110.

Figure 3:
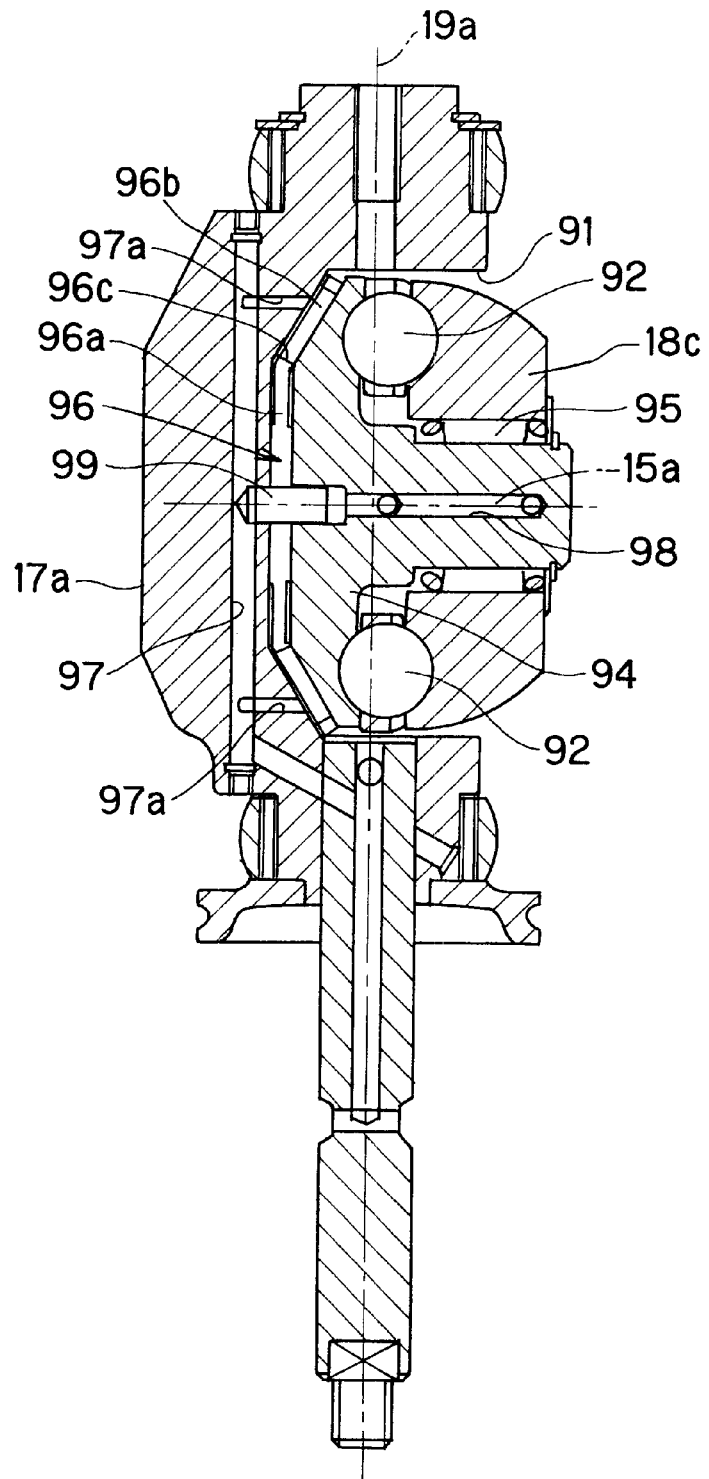
FIG. 3 is a sectional view of a trunnion and a power roller of the CVT.

Next, the supporting structure of the power roller 18c will be described referring to FIGS. 3 and 4. The power rollers 18d, 20c, 20d have identical supporting structures.

A power roller cavity 91 is formed in the trunnion 17a in the direction perpendicular to a trunnion gyration axis 19a and power roller rotation axis 15a. The pedestal 94 for the power roller 18c is supported in the power roller cavity 91 via a roller bearing unit 96. The trunnion 17a gyrates about the trunnion gyration axis 19a perpendicular to the rotation axis 15a of the power roller 18c.

The power roller 18c comes in contact with the input and output disks 18a, 18b, and is supported on the pedestal 94 free to rotate via a roller bearing 95 and ball bearing 92. The load input to the power roller 18c from the input and output disks 18a, 18b is supported by the pedestal 94 via the ball bearing 92.

A roller bearing unit 96 comprises plural needle rollers 96b supported free to rotate in pockets 96c formed in inclined upper and lower parts of the cage 96a, and supports the pedestal 94 free to slide in the direction perpendicular to the trunnion gyration axis 19a and power roller rotation axis 15a. As the inclined parts of the cage 96a are inclined relative to the rotation axis 15a of the power roller and the gyration axis 19a of the trunnion, the needle rollers 96b are also inclined relative to the rotation axis 15a of the power roller and the gyration axis 19a of the trunnion. Therefore, the roller bearing unit 96 can support the thrust force acting on the power roller 18c in the direction of the rotation axis 15a of the power roller, and the frictional force acting in the direction of the trunnion gyration axis 19a from the input and output disks 18a, 18b.

An oil passage 97 to which lubricating oil is supplied from the oil pressure unit, not shown, is formed in the trunnion 17a, and an oil passage 98 which leads lubricating oil from the oil passage 97 to the ball bearing 92 and roller bearing 95 in the power roller 18c, are formed in the pedestal 94. The oil passage 97 and oil passage 98 are connected by an oil passage 99. Oil passages 97a, 97a branch off from the oil passage 97, and lubricating oil is supplied to the roller bearing unit 96 from the oil passages 97a, 97a.

Figures 4A, 4B:
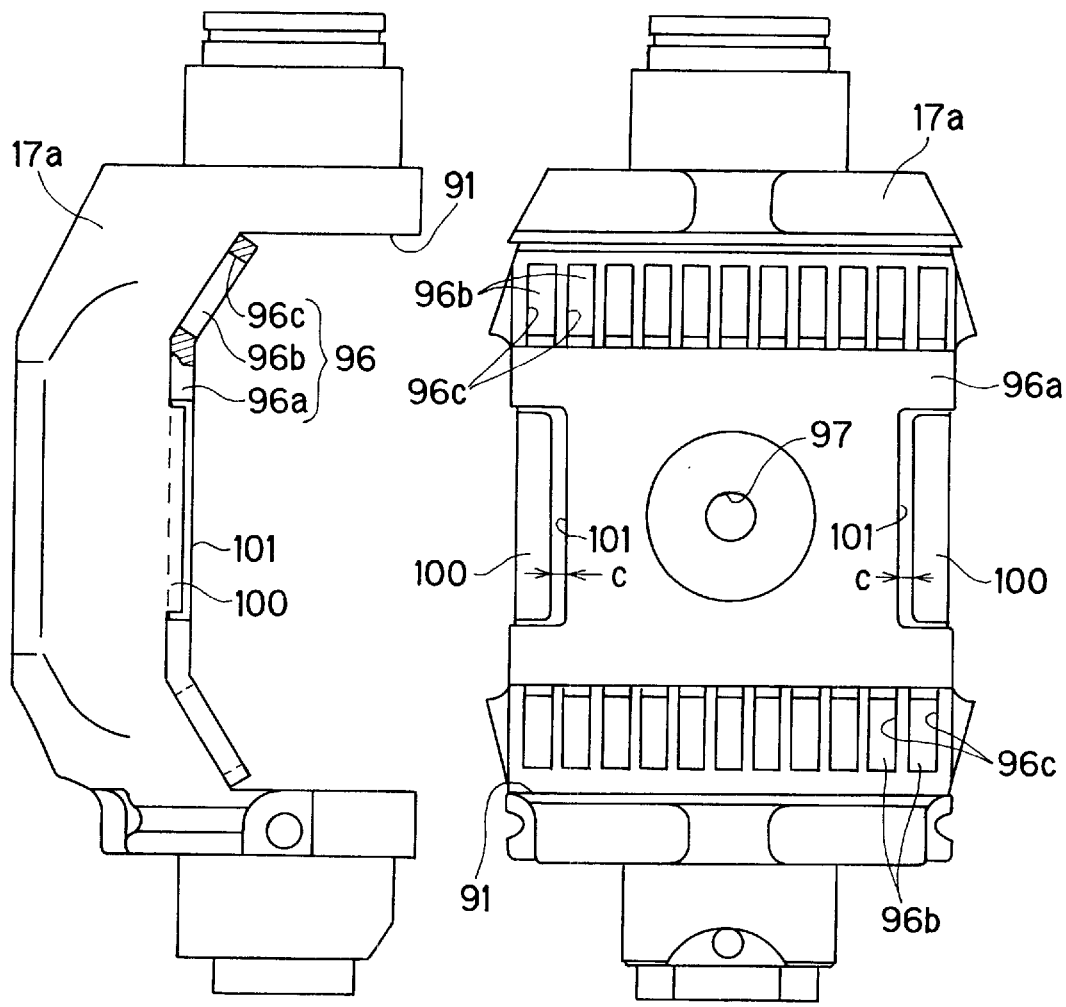
FIG. 4 is a side elevation (FIG. 4(a)) and front elevation (FIG. 4(b)) of the trunnion of the CVT.

As shown in FIGS. 4(a), (b), the roller bearing unit 96 comprises the cage 96a having an inclined part in which plural pockets 96c are formed in the direction perpendicular to the trunnion gyration axis 19a and power roller rotation axis 15a, and needle rollers 96b supported free to rotate in the pockets 96c.

Projections 100 are respectively provided at the ends of the power roller cavity 91 of the trunnion 17a, and depressions 101 into which the projections 100 fit are respectively formed on each side of the cage 96a. By providing the projections 100, the slide amount of the cage 96a relative to the trunnion 17a is limited to a gap C between the cage 96a and the projections 100 in the neutral position shown in FIG. 4(b).

The CVT 10 varies the speed ratio by causing the power rollers 18c, 18d, 20c, 20d to gyrate. That is, if the sleeve 78e displaces due to the step motor 88 rotating, oil supply to the servo piston chambers of the servo pistons 70a, 70b, 72a, 72b is controlled, and the rotation centers of the power rollers 18a, 18b, 20a, 20b will be offset relative to the rotation centers of the disks 18a, 18b, 20a, 20b. Due to the offset, a gyration force acts on the power rollers 18c, 18d, 20c, 20d, and their gyration angles vary. The gyration angle and offset amount are transmitted to the spool 78d via the cam 86 and lever 84, and the power rollers come to rest in a position where they balance the sleeve 78e which displaces due to the step motor 88. The step motor 88 displaces the sleeve 78e by a command from the CVT controller 110 according to the target speed ratio.

When power is transmitted, the load input to the power roller 18c from the input and output disks 18a, 18b is supported by the pedestal 94 via the ball bearing 92. Due to the roller bearing unit 96 interposed between the pedestal 94 and power roller cavity 91, the thrust force acting on the power roller 18c in the rotation axis direction of the power roller is supported, and the frictional force acting on the power roller 18c from the input and output disks in the direction of the trunnion gyration axis is supported.

Therefore, when a force in the direction of the trunnion gyration axis acts on the power roller 18c, this load is supported by the roller bearing unit 96, and when a load acts on the power roller 18c in the direction perpendicular to the trunnion gyration axis 19a and power roller rotation axis 15a, the pedestal 94 slides in the direction while the needle rollers 96b of the roller bearing unit 96 turn. In other words, even if a force acts on the power roller 18c in the direction of the trunnion gyration axis, the power roller 18c can displace smoothly in the direction perpendicular to the trunnion gyration axis 19a and power roller rotation axis 15a.

Hence, if the input and output disks 18a, 18b deform or are imprecisely assembled, the power roller 18c can still slide smoothly in the direction perpendicular to the trunnion gyration axis 19a and power roller rotation axis 15a to absorb these positional deviations, and the thrust force acting on the power roller 18c from the input disk 18a is maintained equal to the thrust force acting on the power roller 18c from the output disk 18b.

Therefore, imbalance of the thrust force from the input disk 18a and the thrust force from the output disk 18b, and slip between the input and output disks 18a, 18b and power roller 18c, are suppressed.

As it is not necessary to provide a hole for supporting the pivot shaft which supports the power roller 18c in the trunnion 17a, the strength of the trunnion 17a is ensured and deformation of the trunnion 17a is suppressed. Consequently, the contact position of the input and output disks 18a, 18b and the power roller 18c does not shift much from the desired position, and the increase of surface pressure as a result of unequal load or variation of speed ratio due to deformation can be decreased.

As mentioned above, when a deformation or assembly error of the input and output disks 18a, 18b occurs, in order to absorb these positional deviations, the power roller 18c slides in the direction perpendicular to the trunnion gyration axis and power roller rotation axis. When the power roller 18c slides repeatedly in the direction perpendicular to the trunnion gyration axis and power roller rotation axis, the force which acts on the cage 96a of the roller bearing 96 interposed between the base 94 and the power roller cavity 91, is different when the power roller 18c is pushed and the cage 96a slides, and when the force on the power roller 18c is released and the cage 96a returns, so the cage 96a tends to protrude from the trunnion 17a.

However, as the projections 100 which limit the slide amount of the cage 96a relative to the trunnion 17a in the direction perpendicular to the trunnion gyration axis 19a and power roller rotation axis 15a are provided between the cage 96a and trunnion 17a, the cage 96a does not protrude or fall out from the trunnion 17a, and the support of the load acting on the power roller 18c is maintained at a sufficient level.

As described above, according to this invention, the projections 100 which limit the slide amount of the cage 96a relative to the trunnion 17a in the direction of the input and output disk rotation axis are provided between the cage 96a and trunnion 17a, so the cage 96a is prevented from protruding from the trunnion 17a even if the power roller 18c repeatedly slides relative to the trunnion 17a. Insufficiency of support for the load acting on the power roller 18c is prevented, and interference of the cage 96a with the input and output disks 18a, 18b, which would occur if the cage did protrude, is prevented.

Moreover, the pedestal 94 is supported free to slide in the direction perpendicular to the trunnion gyration axis 19a and power roller rotation axis 15a, and the roller bearing unit 96 is provided supporting both the thrust force acting in the power roller rotation axis direction, and the frictional force with the input and output disks acting in the direction of the trunnion gyration axis. Thus, even if a frictional force acts on the power roller 18c, the power roller 18c can slide smoothly in the direction perpendicular to the trunnion gyration axis 19a and power roller rotation axis 15a.

A second embodiment will now be described.

Figure 5:
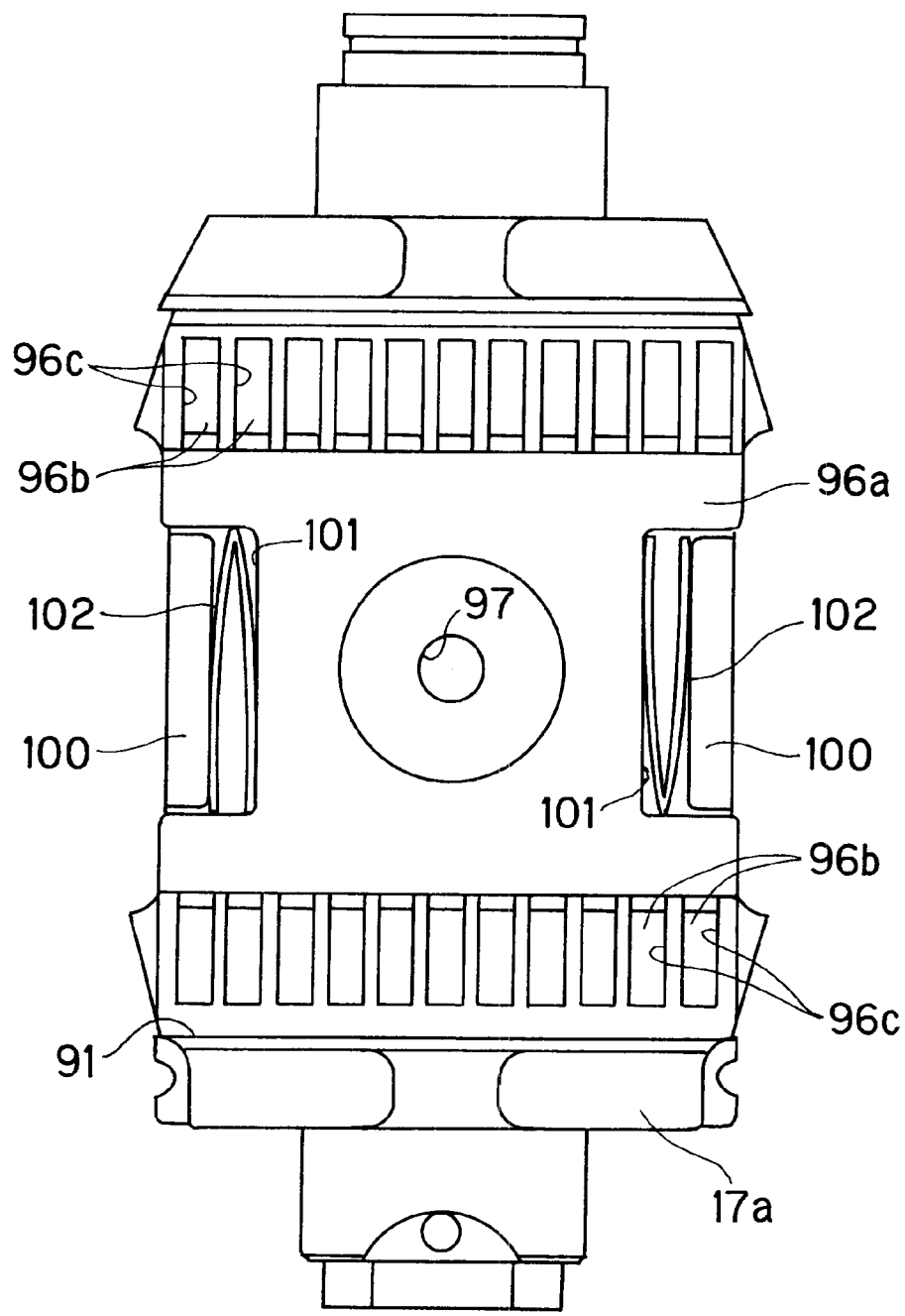
FIG. 5 is similar to FIG. 4(b), but showing a second embodiment of this invention.

In this embodiment, leaf springs 102, 102 (elastic member) are interposed respectively between the projections 100 formed in the power roller cavity 91 and the cage 96a, as shown in FIG. 5. The remaining features of the construction are identical to those of the first embodiment shown in FIGS. 3 and 4, so the same symbols are assigned to them and their description is omitted.

In the second embodiment, in addition to the effect of the first embodiment, the following effect can be obtained.

By interposing the leaf springs 102, 102 between the projections 100 and the cage 96a, the projection 100 and cage 96a are no longer in direct contact. As a result, even if the power roller 18c slides due to the deformation of the input and output disks 18a, 18b or to assembly errors, the needle rollers 96b and the pedestal 94 of the roller bearing unit 96 are always in rolling contact, friction decreases, and the ability of the power roller 18c to track the input and output disks 18a, 18b improves.

Moreover, as the needle rollers 96b and the pedestal 94 are always in rolling contact, even when the power roller 18c slides repeatedly, the force which acts on the pedestal 94 when the power roller 18c is pushed and the cage 96a moves, and when the force acting on the power roller 18c is released and the cage 96a returns, is uniform, and hysteresis of speed ratio control is reduced.

If on the other hand this invention is not applied, the needle rollers 96b will stop rolling when the cage 96a contacts with the projection 100 of one of the trunnions 17a, so the roller bearing unit 96 and the pedestal 94 will be in sliding contact instead of rolling contact. The resistance when the pedestal 94 supporting the power roller 18c slides therefore increases, and the power roller 18c follows the input and output disks 18a, 18b with a delay. When the power roller returns, they are again in rolling contact and the resistance when the pedestal 94 slides, decreases. Hence, the resistance when the pedestal 94 moves away and returns is different, and hysteresis appears in the speed ratio control.

The elastic member interposed between the projection 100 and depression 101 may be coil spring or a resin elastic member. The same effect is obtained also in this case.

A third embodiment will now be described.

Figure 6:
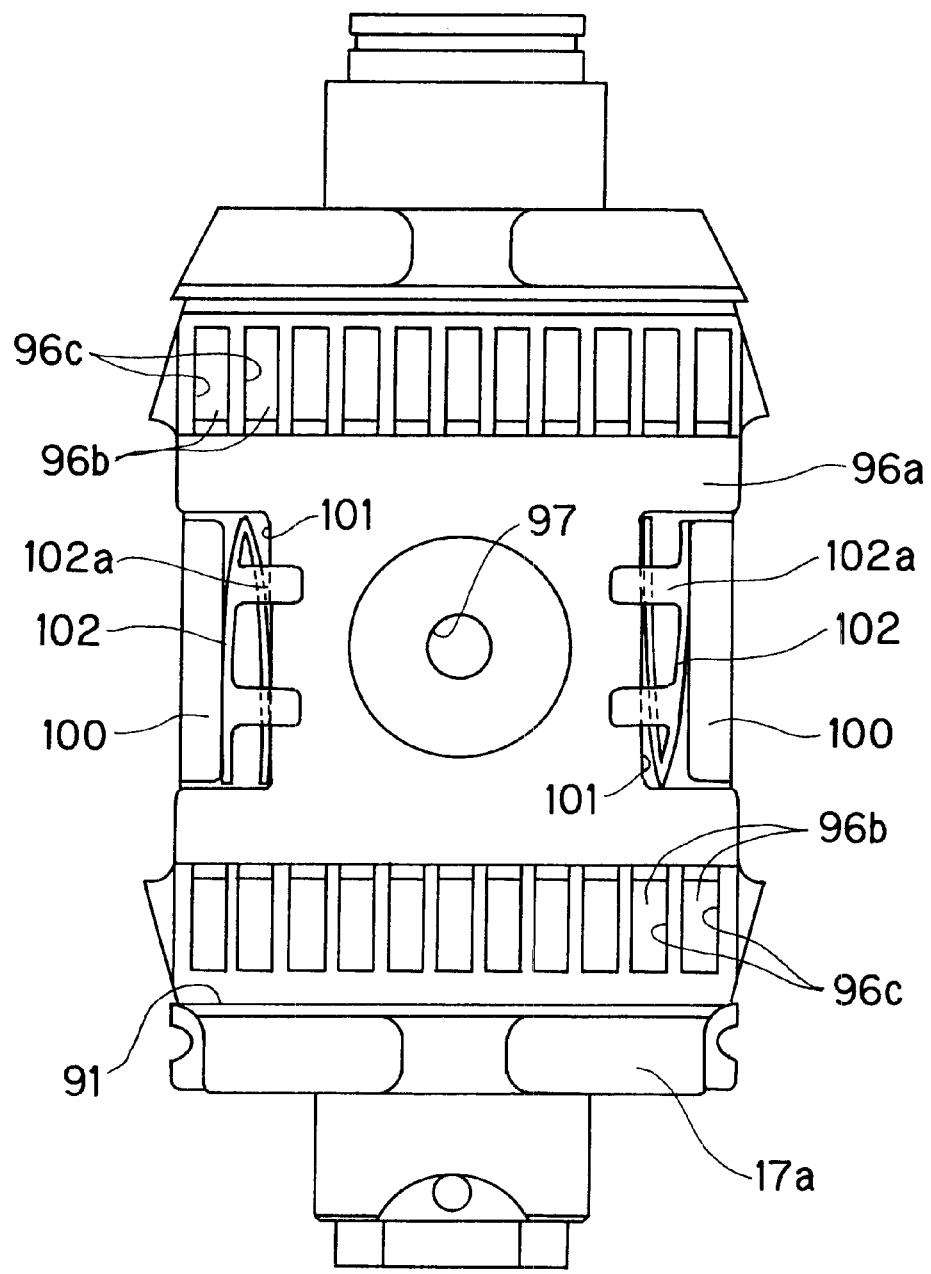
FIG. 6 is similar to FIG. 4(b), but showing a third embodiment of this invention.

In this embodiment, as shown in FIG. 6, the leaf springs 102, 102 are respectively interposed between the projections 100 formed in the power roller cavity 91 and the cage 96a. Tongues 102a, 102a are formed on the leaf springs 102, 102. The cage 96a and the leaf springs 102, 102 are connected by fixing the tongues 102a, 102a to the cage 96a. The remaining features of the construction are identical to those of the first embodiment shown in FIGS. 3 and 4, so the same symbols are assigned to them and their description is omitted.

Therefore, in this embodiment, in addition to the effect of the second embodiment, the roller bearing unit 96 is held in the trunnion 17a by the plate springs 102, 102, so the roller bearing unit 96 is prevented from falling out of the power roller cavity 91 during assembly. In other words, even if the roller bearing unit 96 is not supported during assembly, the state shown in FIG. 6 can be maintained and assembly is easier.

Here, the plate springs 102 are connected to the cage 96a by the tongues 102a, but the leaf springs 102 and cage 96a may be connected by another method. Further, an elastic member other than a leaf spring may be used.

A fourth embodiment will now be described.

Figure 7:
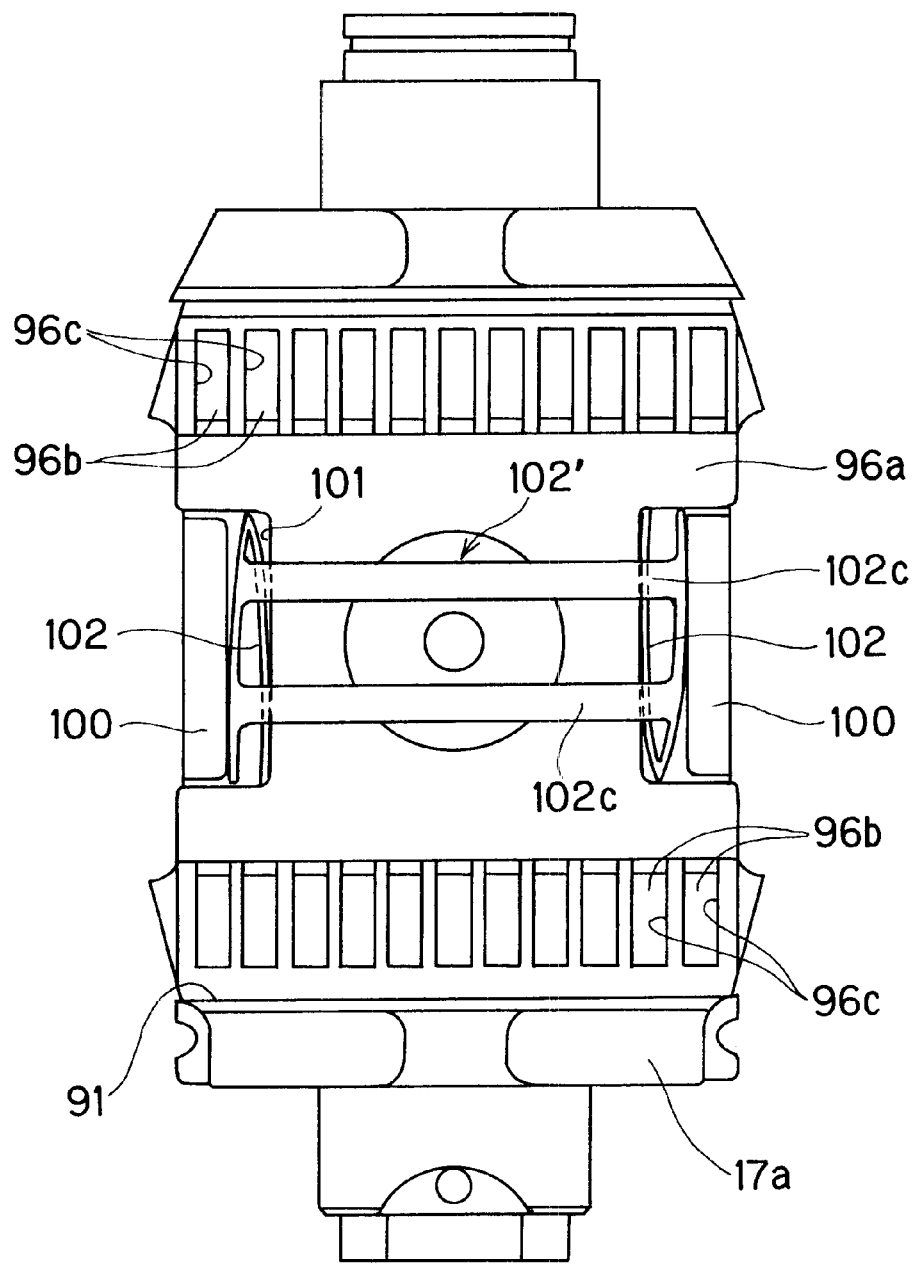
FIG. 7 is similar to FIG. 4(b), but showing a fourth embodiment of this invention.

In this embodiment, as shown in FIG. 7, the leaf springs 102, 102 are interposed between the projections 100 and the cage 96a, the leaf springs 102, 102 are connected by connecting plates 102c, 102c (connecting member), and the connecting plates 102c, 102c are fixed to the cage 96a. The remaining features of the construction are identical to those of the first embodiment shown in FIGS. 3 and 4, so the same symbols are assigned to them and their description is omitted.

Therefore, in this embodiment, in addition to the effect of the second embodiment, the roller bearing unit 96 is prevented from falling out of the power roller cavity 91, and assembly is easier. Further, compared to the third embodiment, the number of parts is reduced.

Figure 8:
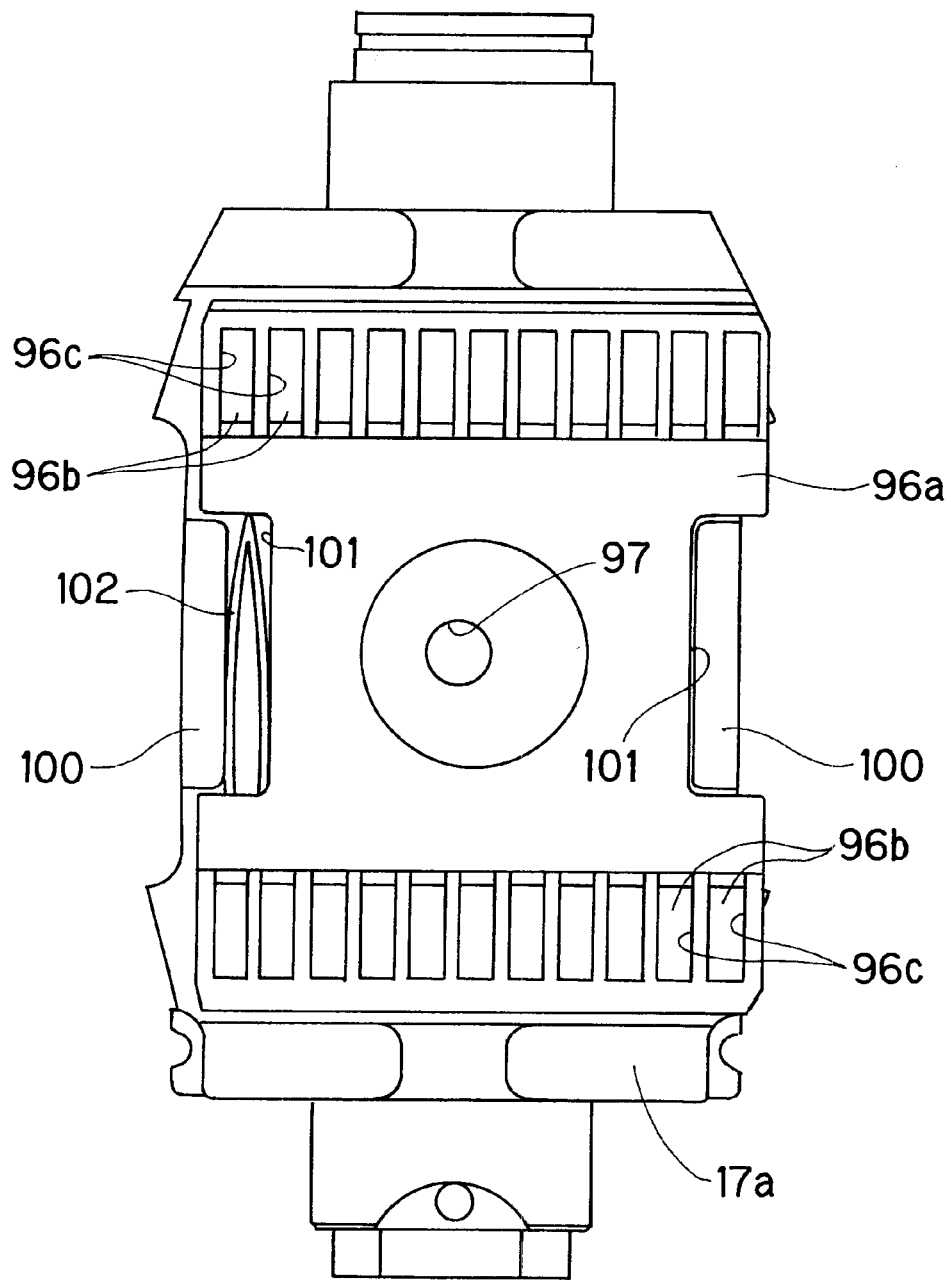
FIG. 8 is similar to FIG. 4(b), but showing a fifth embodiment of this invention.

FIG. 8 shows a fifth embodiment

In the fifth embodiment, of the gaps between the projections 100 and cage 96a, the leaf spring 102 is provided only in the gap which becomes smaller when the pedestal 94 repeatedly slides due to deformation of the input and output disks 18a, 18b, here, only in the gap nearer the output disk. The remaining features of the construction are identical to those of the first embodiment shown in FIGS. 3 and 4, so the same symbols are assigned to them and their description is omitted.

Thus, even if the elastic member is provided only in the gap which decreases when the pedestal 94 slides repeatedly, rolling contact of the roller bearing unit 96 and the pedestal 94 can be maintained. Compared to the case where the plate springs 102, 102 are provided on both sides of the roller bearing unit 96, the number of parts can be cut down and costs can be reduced.

The entire contents of Japanese Patent Application P11-350008 (filed Dec. 9, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

INDUSTRIAL FIELD OF APPLICATION

As described above, the toroidal continuously variable transmission of this invention is useful to provide adequate support for the load acting on the power roller and prevent interference between the cage of the roller bearing unit and the input and output disks. It is moreover useful to enhance the response characteristics of the transmission and ease of assembly.

What is claimed is:

1. A toroidal continuously variable transmission comprising:
    an input disk;
    an output disk facing the input disk;
    a power roller gripped between the input disk and output disk;
    a pedestal which supports the power roller free to rotate about a power roller rotation axis;
    a trunnion which gyrates about a trunnion gyration axis;
    a roller bearing unit which comprises a cage housing a roller and supports the pedestal on the trunnion so that the pedestal is free to slide only in a direction perpendicular to the trunnion gyration axis and power roller rotation axis; and
    a limiting member, which limits the slide amount of the cage of the roller bearing unit relative to the trunnion, provided on the trunnion.

2. A toroidal continuously variable transmission as defined in claim 1, wherein the cage houses the roller so that the roller inclines relative to the power roller rotation axis and the trunnion gyration axis.

3. A toroidal continuously variable transmission as defined in claim 2, further comprising an elastic member provided between the limiting member and the cage.

4. A toroidal continuously variable transmission as defined in claim 1, further comprising an elastic member provided between the limiting member and the cage.

5. A toroidal continuously variable transmission as defined in claim 4, wherein the elastic member is connected to the cage.

6. A toroidal continuously variable transmission as defined in claim 5, wherein the elastic member is provided on both sides of the cage, the elastic members are connected by a connecting member, and the elastic members are connected to the cage via the connecting member.

7. A toroidal continuously variable transmission as defined in claim 4, wherein gaps are formed between the limiting member and the cage, the elastic member is provided only in one of the gaps which becomes small when the pedestal repeatedly slides due to deformation of the input and output disks.

8. A toroidal continuously variable transmission according to claim 1, wherein the limiting member contacts the roller bearing unit at both ends of the roller bearing unit in the direction perpendicular to the trunnion gyration axis and the power roller rotation axis and adjacent to the center of the roller bearing unit in a direction of the trunnion gyration axis.

* * * * *